(12) United States Patent
Egg

(10) Patent No.: US 10,742,333 B2
(45) Date of Patent: Aug. 11, 2020

(54) SYSTEM AND METHOD FOR CREATION OF A DYNAMICALLY SHARP FILTER

(71) Applicant: Benjamin J. Egg, Manti, UT (US)

(72) Inventor: Benjamin J. Egg, Manti, UT (US)

( * ) Notice: Subject to any disclaimer, the term of this patent is extended or adjusted under 35 U.S.C. 154(b) by 0 days.

(21) Appl. No.: 16/035,586

(22) Filed: Jul. 13, 2018

(65) Prior Publication Data

US 2019/0339353 A1    Nov. 7, 2019

Related U.S. Application Data

(60) Provisional application No. 62/531,881, filed on Jul. 13, 2017.

(51) Int. Cl.
| | | |
|---|---|---|
| *H04B 15/00* | (2006.01) | |
| *H04B 7/185* | (2006.01) | |
| *H04B 1/10* | (2006.01) | |
| *H04B 1/00* | (2006.01) | |
| *H04B 1/04* | (2006.01) | |

(Continued)

(52) U.S. Cl.
CPC ............. *H04B 15/00* (2013.01); *G01S 1/302* (2013.01); *G01S 5/0294* (2013.01); *G01S 19/393* (2019.08); *G05D 1/12* (2013.01); *G06F 21/602* (2013.01); *H04B 1/0071* (2013.01); *H04B 1/0475* (2013.01); *H04B 1/1081* (2013.01); *H04B 1/40* (2013.01); *H04B 7/1858* (2013.01); *H04B 7/18506* (2013.01);

(Continued)

(58) Field of Classification Search
CPC .... H04B 15/00; H04B 1/0071; H04B 1/0475; H04B 1/1081; H04B 1/40; H04B 7/18506; H04B 7/18513; H04B 7/1858; H04B 7/18582; G01S 19/393; G01S 1/302; G01S 5/0294; G05D 1/12; G06F 21/602; H04K 3/44
USPC ........................................................ 342/450
See application file for complete search history.

(56) References Cited

U.S. PATENT DOCUMENTS

| | | | | |
|---|---|---|---|---|
| 4,735,379 A | * | 4/1988 | Leveque ............... | F41G 7/2226 244/3.15 |
| 5,892,479 A | * | 4/1999 | Mills .................... | G01S 7/4052 342/169 |

(Continued)

OTHER PUBLICATIONS

"Evaluation of Angle of Arrival Estimation for Localization in Multiple Indoor Environments", Stijn Wielandt, Anneleen Van Nieuwenhuyse, Jean-Pierre Goemaere, Bart Nauwelaers, Lieven De Strycker, DraMCo research group, ESAT KU Leuven (Year: 2014).*

*Primary Examiner* — Peter M Bythrow
*Assistant Examiner* — Alexander L. Syrkin
(74) *Attorney, Agent, or Firm* — Malone IP Law; Steven J. Malone

(57) ABSTRACT

A method of creating a dynamically sharp location based filter includes: placing a moving object containing two or more antennas used for direction finding of a radiation source within a anechoic testing chamber; moving one or more radio transmitters within the anechoic chamber relative to a future spatial location, angle, and/or position of the moving object over a defined time; record an expected angle of arrival of one or more signals of the one or more radio transmitters with respect to the future spatial location, angle, and/or position of the moving object over the defined time; and program a filter within the moving object based on the recorded expected angle of arrival of the one or more signals.

2 Claims, 5 Drawing Sheets

(51) Int. Cl.
  *H04K 3/00* (2006.01)
  *G01S 19/39* (2010.01)
  *G01S 5/02* (2010.01)
  *G01S 1/30* (2006.01)
  *G05D 1/12* (2006.01)
  *G06F 21/60* (2013.01)
  *H04B 1/40* (2015.01)

(52) U.S. Cl.
  CPC ..... *H04B 7/18513* (2013.01); *H04B 7/18582* (2013.01); *H04K 3/44* (2013.01)

(56) References Cited

U.S. PATENT DOCUMENTS

| | | | |
|---|---|---|---|
| 6,296,205 B1 * | 10/2001 | Hanson | B64G 1/1078 244/158.1 |
| 7,068,209 B2 * | 6/2006 | Gounalis | G01S 7/021 342/13 |
| 8,938,483 B1 * | 1/2015 | Egg | H03H 17/0223 708/319 |
| 9,537,604 B2 * | 1/2017 | Dowla | H04K 3/44 |
| 9,584,232 B1 * | 2/2017 | Dolan | H04B 17/3912 |
| 9,660,739 B2 * | 5/2017 | Reed | H04B 17/29 |
| 2004/0113831 A1 * | 6/2004 | Gounalis | G01S 7/021 342/13 |
| 2004/0135717 A1 * | 7/2004 | Gounalis | G01S 7/021 342/13 |
| 2007/0222673 A1 * | 9/2007 | Gounalis | G01S 7/021 342/165 |
| 2015/0234053 A1 * | 8/2015 | Psiaki | G01S 19/215 342/357.51 |
| 2016/0233970 A1 * | 8/2016 | Reed | H04B 17/12 |
| 2017/0143494 A1 * | 5/2017 | Mahfouz | A61B 34/20 |
| 2018/0004207 A1 * | 1/2018 | Michini | G08G 5/0069 |

* cited by examiner

SYSTEM AND METHOD FOR CREATION OF A DYNAMICALLY SHARP FILTER

RELATED APPLICATIONS

This application claims priority to U.S. Provisional Application Ser. No. 62/531,881 titled "High Speed Data Sampling For Filtering, Recreating GPS Signals, and High Speed Communications" filed on Jul. 13, 2017 which is hereby incorporated by reference, in its entirety, for all it teaches and discloses.

FIELD OF THE INVENTION

The present invention discloses a system and method for digital direction finding and creation of a dynamically sharp filter.

SUMMARY

A method of creating a dynamically sharp location based filter for a flying object includes: placing a recording object with at least a pair of antennas used for direction finding of one or more moving radio transmitters transmitting one or more radio signals within a testing chamber; moving the one or more radio transmitters within the testing chamber relative to a future spatial location, angle, and/or position of the flying object over a defined time; transmitting the one or more radio signals from the one or more radio transmitters to the recording object within the testing chamber; recording an expected angle of arrival of the one or more radio signals of the one or more moving radio transmitters with respect to the future spatial location, angle, and/or position of the flying object over the defined time based on a flight plan of the flying object; and programming a filter within the flying object based on the recorded expected angle of arrival of the one or more transmitted radio signals.

A method for finding an orthogonal direction of a radiation source with respect a digitally optimized interference pattern of a first fixed electromagnetic element and a second fixed electromagnetic element includes: one or more processors including non-transitory memory programmed to: detect a first signal associated with the first fixed electromagnetic element, the first signal transmitted by the radiation source; detect a second signal associated with the second fixed electromagnetic element, the second signal transmitted by the radiation source; recursively digitally phase shift the first detected signal and/or the second detected signal to create a changing interference pattern; sample the changing interference pattern while digitally phase shifting the first detected signal and/or the second detected signal to obtain the digitally optimized interference pattern, wherein the digitally optimized interference pattern is formed by destructive interference between the first signal and the second signal to obtain a local minima associated with the destructive interference; bisect the digitally optimized interference pattern about the local minima forming a reference line or a reference plane; determine the orthogonal direction of the radiation source using the reference line or the reference plane; and use the determined orthogonal direction of the radiation source with respect to the digitally optimized interference pattern of the first fixed electromagnetic element and the second fixed electromagnetic element to at least partially control a vehicle, a flying device, an electronic device, a satellite, an autonomous vehicle, a projectile, an autonomous robot, a tracking system, or a combination thereof.

The digitally optimized interference pattern may contain maximum near-field interference associated with the fixed positions of the first fixed electromagnetic element and the second fixed electromagnetic element. The fixed positions of the first fixed electromagnetic element and the second fixed electromagnetic element may be spaced apart less than 1 wavelength of the first signal or the second signal. The fixed positions of the first fixed electromagnetic element and the second fixed electromagnetic element may be spaced apart less than ½ wavelength of the first signal and/or the second signal. The fixed positions of the first fixed electromagnetic element and the second fixed electromagnetic element may be spaced apart approximately ¼ wavelength or ¼ wavelength multiples of the first signal and/or the second signal. The local minima of the digitally optimized interference pattern may be a maximized local minima of the destructive interference between the first signal and the second signal. The bisection of the digitally optimized interference pattern may be a symmetrical bisection about an axis formed by the local minima. The fixed positions of the first fixed electromagnetic element and the second fixed electromagnetic element may be intentionally spaced apart to cause destructive interference between the first signal and the second signal. The digitally optimized interference pattern may be a digitally optimized near-field interference pattern. The first fixed electromagnetic element and the second fixed electromagnetic element may be co-located on the same printed circuit board. The first fixed electromagnetic element and the second fixed electromagnetic element may be electrical elements of an integrated circuit chip package. The first fixed electromagnetic element and the second fixed electromagnetic element may be electrical antennas. The first fixed electromagnetic element and the second fixed electromagnetic element may be at least partially encapsulated in a common medium. The first fixed electromagnetic element and the second fixed electromagnetic element may be similar electrical antennas. The first fixed electromagnetic element and the second fixed electromagnetic element may be non-similar electrical antennas. The first fixed electromagnetic element or the second fixed electromagnetic element may be a ground plane of a printed circuit board. The first fixed electromagnetic element or the second fixed electromagnetic element may be a planar micro-strip antenna. The first fixed electromagnetic element and/or the second fixed electromagnetic element may be printed antennas. The first fixed electromagnetic element and the second fixed electromagnetic element may be separated by a dielectric layer of a printed circuit board. The radiation source may be a moving electromagnetic radiation source.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
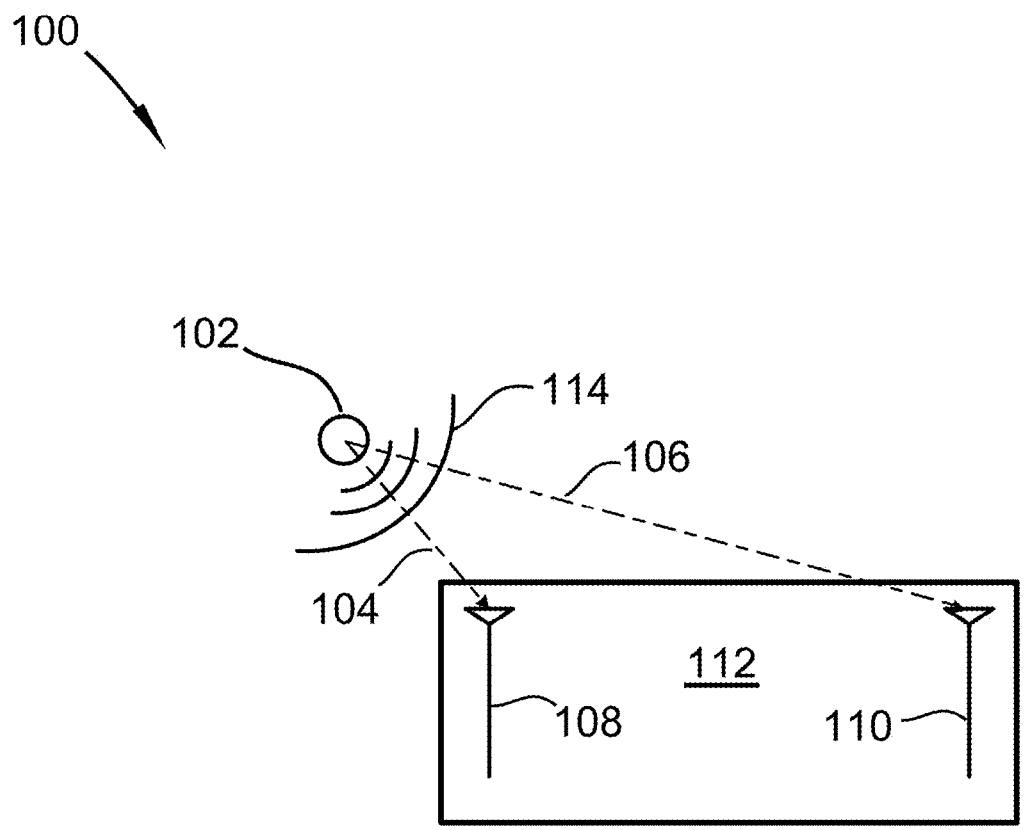
FIG. 1 shows a direction finding antenna system in accordance with an embodiment of the invention.

FIG. 1 shows a direction finding system and method 100 including a radiation source 102, electromagnetic radiation 114, a first signal 104 and a first element 108, a second signal 106 and a second element 110, and a common circuit board 112. In one embodiment, antenna element 108 and antenna element 110 create an interference pattern relative to the positioning of each antenna when receiving a radiated signal 114 by way of signals 104 and 106. The method includes: detecting a first signal 104 associated with the first fixed electromagnetic element 108, the first signal transmitted by the radiation source 102; detect a second signal 106 associated with the second fixed electromagnetic element 110, the second signal transmitted by the radiation source 102; recursively digitally phase shift the first detected signal and/or the second detected signal to create a changing interference pattern using one or more processors; sampling the changing interference pattern while digitally phase shifting the first detected signal and/or the second detected signal to obtain the digitally optimized interference pattern, wherein the digitally optimized interference pattern is formed by destructive interference between the first signal and the second signal to obtain a local minima associated with the destructive interference; bisecting the digitally optimized interference pattern about the local minima forming a reference line or a reference plane; determining the orthogonal direction of the radiation source using the reference line or the reference plane; and using the determined orthogonal direction of the radiation source with respect to the digitally optimized interference pattern of the first fixed electromagnetic element and the second fixed electromagnetic element to at least partially control a vehicle, a flying device, an electronic device, a satellite, an autonomous vehicle, a projectile, an autonomous robot, a tracking system, or a combination thereof.

Figure 2:
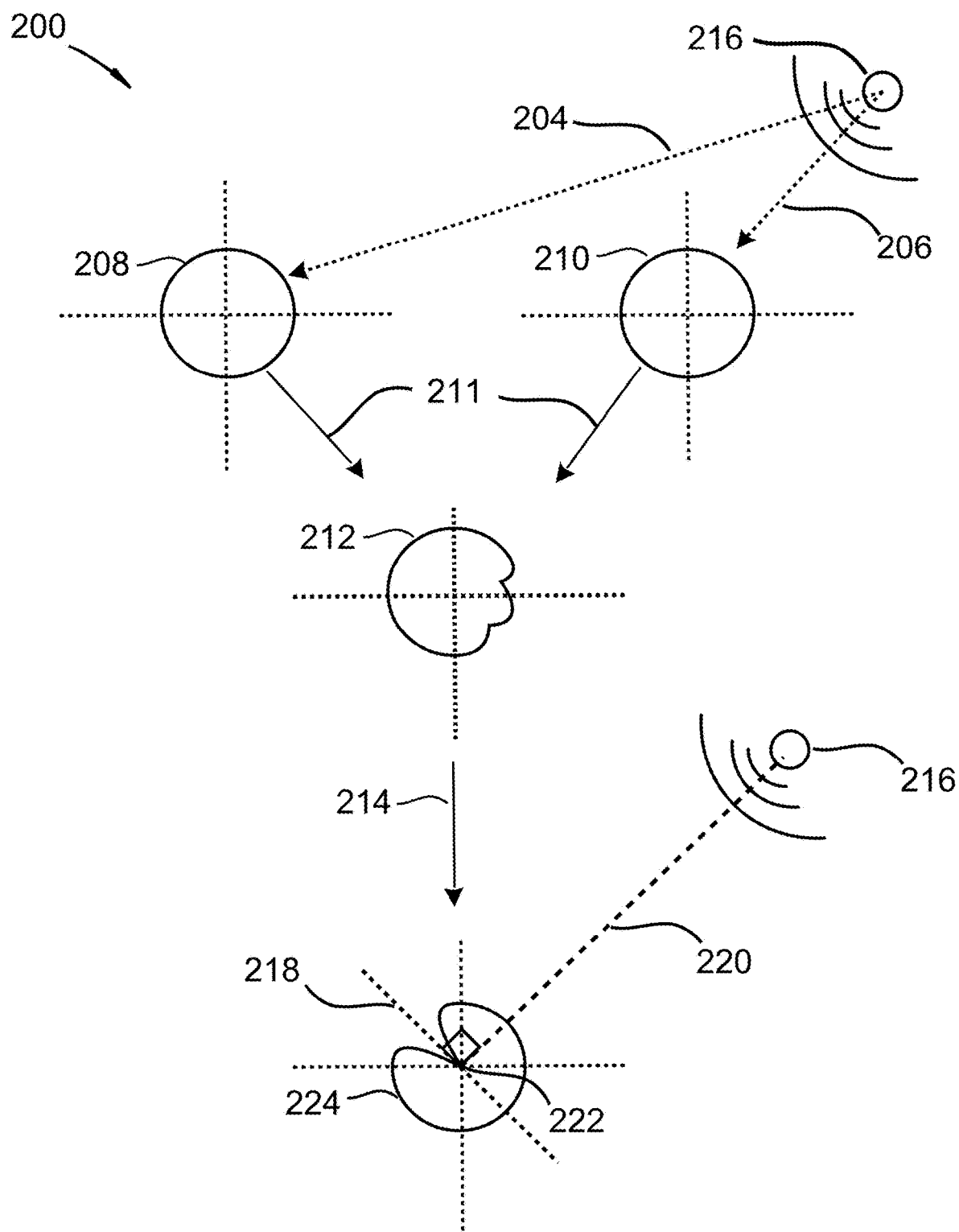
FIG. 2 shows a direction finding antenna method in accordance with an embodiment of the invention.

FIG. 2 illustrates a method 200 described in relation to FIG. 1. The method includes: detecting a first signal 204 associated with the first fixed electromagnetic element 208, the first signal transmitted by the radiation source 216; detect a second signal 206 associated with the second fixed electromagnetic element 210, the second signal transmitted by the radiation source 216; recursively digitally phase shift the first detected signal and/or the second detected signal 211 (rotating one in reference to the other) to create a changing interference pattern 212 using one or more processors; sampling 214 the changing interference pattern 212 while digitally phase shifting the first detected signal and/or the second detected signal to obtain the digitally optimized interference pattern 224, wherein the digitally optimized interference pattern is formed by destructive interference between the first signal and the second signal to obtain a local minima 222 associated with the destructive interference; bisecting 218 the digitally optimized interference pattern about the local minima forming a reference line or a reference plane 218; determining the orthogonal direction 220 of the radiation source 216 using the reference line or the reference plane; and using the determined orthogonal direction of the radiation source with respect to the digitally optimized interference pattern of the first fixed electromagnetic element and the second fixed electromagnetic element to at least partially control a vehicle, a flying device, an electronic device, a satellite, an autonomous vehicle, a projectile, an autonomous robot, a tracking system, or a combination thereof.

Figure 3:
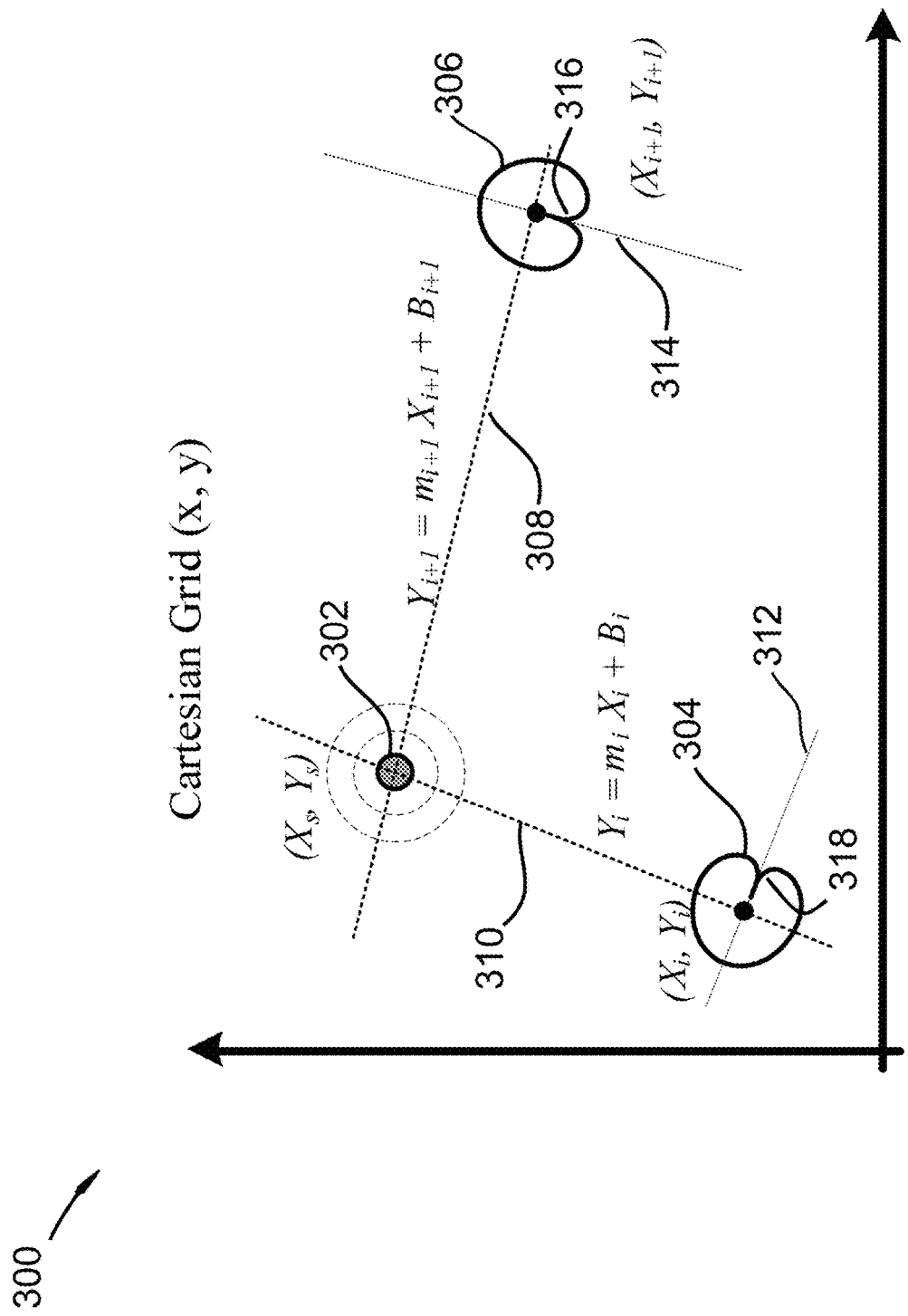
FIG. 3 shows a direction finding antenna method in accordance with an embodiment of the invention.

FIG. 3, illustrates a method 300 of pin pointing a radiation source using a pair of antenna pairs 304/306 (two of FIG. 1). The method includes: bisecting 312 a first digitally optimized interference pattern about the local minima 318 forming a reference line or a reference plane 312 and determining the orthogonal direction 310 of the radiation source 302 using the reference line or the reference plane of a first pair of antennas 304; and bisecting 314 the second digitally optimized interference pattern about the local minima 316 forming a reference line or a reference plane 314 and determining the orthogonal direction 308 of the radiation source 302 using the reference line or the reference plane of a second pair of antennas 306; and determining the radiation source 302 to be at the intersection 302 of the first and second orthogonal directions 308/310 in relation to reference plane 314 and reference plane 312.

Figure 4:
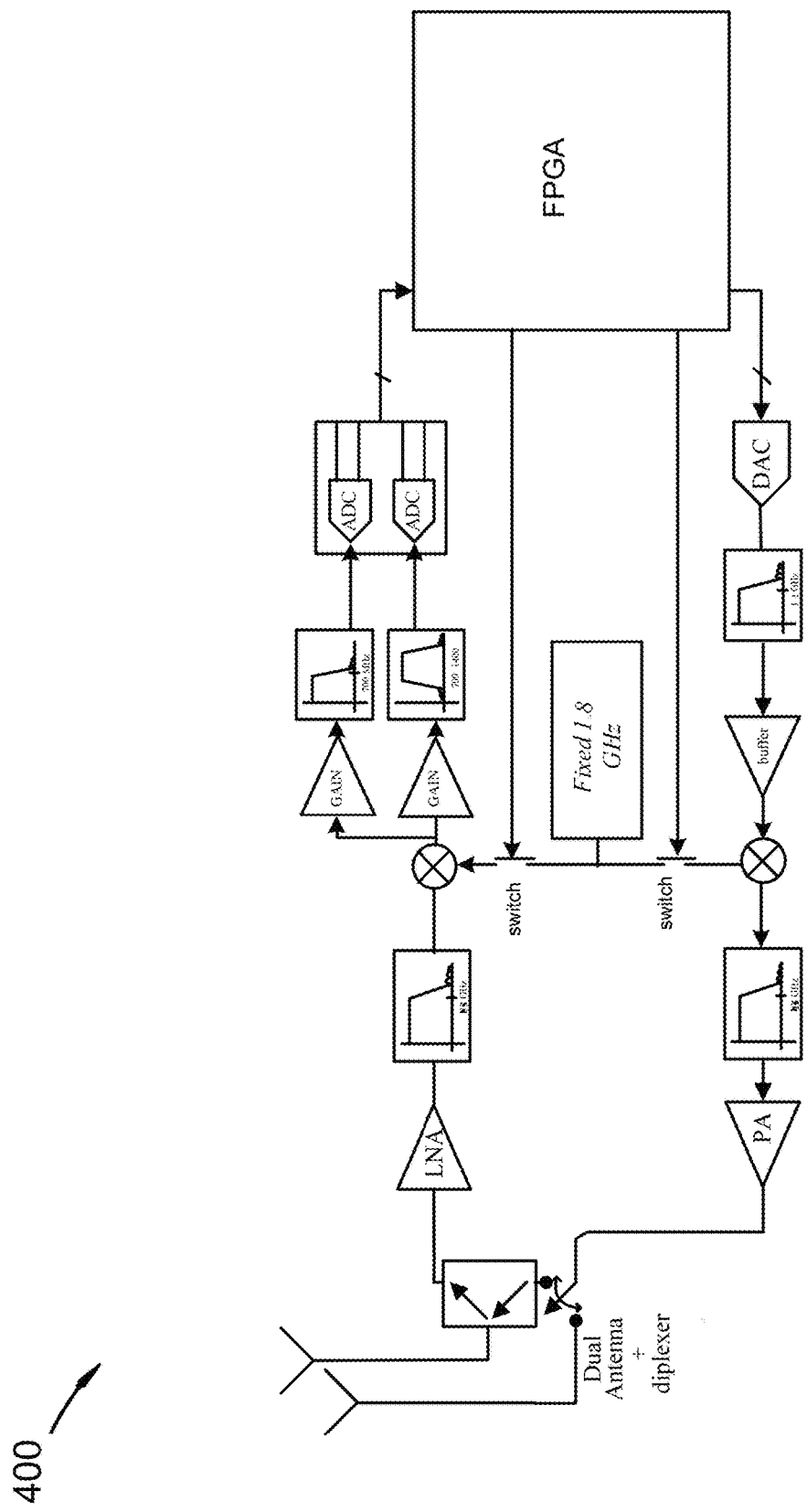
FIG. 4 show a direction finding antenna system in accordance with an embodiment of the invention.

FIG. 4 shows a function block diagram 400 of a system for detecting, sampling, and processing interference patterns of the direction finding invention. A dual antenna diplexer may be used to receive the radiation energy at the first antenna and the second antenna. Fast sampling at 1.8 GHz or higher may be used to sample differences between the two antenna interference patterns. Data sampled may be processed by a FPGA with parallel data processing techniques. DAC, ADC, LNA and PA may be used to condition, filter and detect signals in accordance with known digital signal processing techniques.

Figure 5:
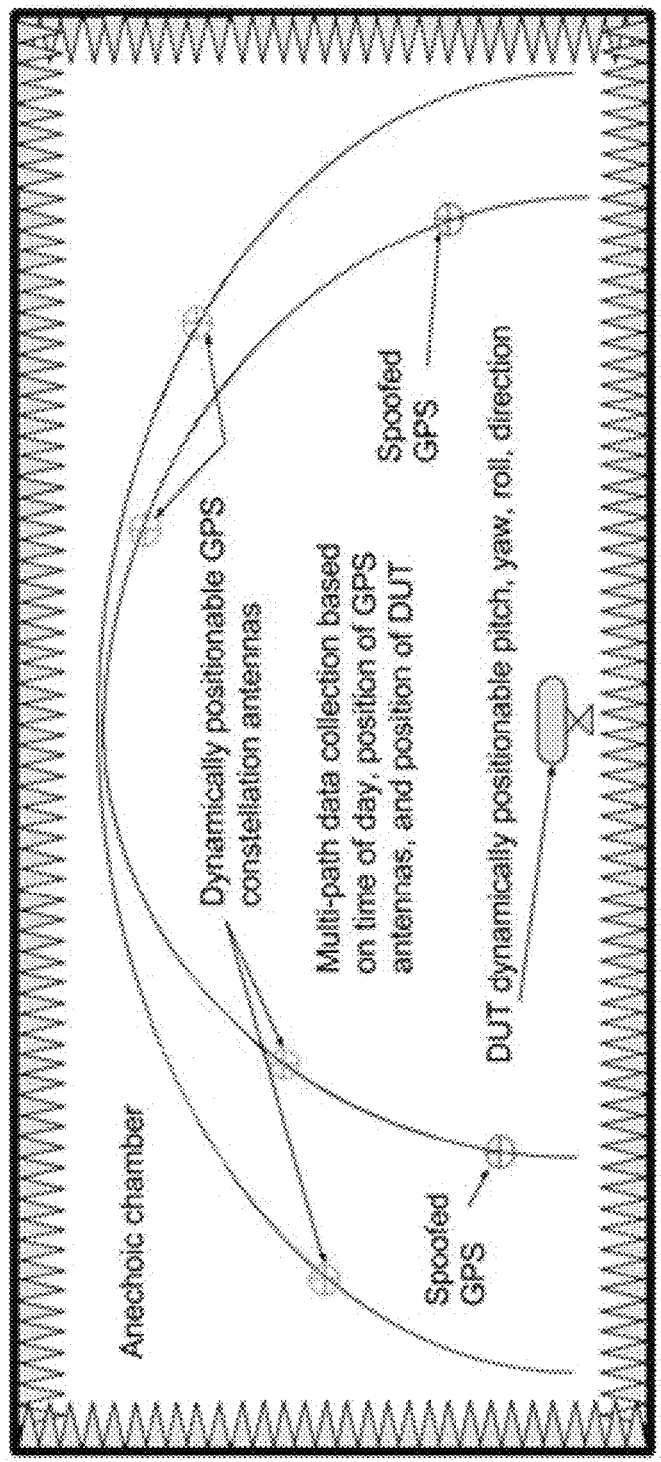
FIG. 5, shows a recording object within a testing chamber in accordance with an embodiment of the invention.

FIG. 5, shows a testing chamber 500 including a recording object within a testing chamber. Electromagnetic ration sources are positioned to create dynamically moving radiation sources within the testing chamber. The testing chamber may be an anechoic chamber. The recording object may be positioned on a moving table and can pitch, roll, yaw, and change direction while under test. In one embodiment, a missile or simulated missile may be the recording object positioned on the moving table and GPS constellations are the radio transmitters that can move within the testing chamber. A flight plan may be loaded to control GPS transmitters to create a future scenario of a flight of the missile. The missile may have a future starting location and future flight plan that is loaded into a program controlling positions and locations of GPS transmitters and positions and angles of the missile. The missile may record using direction finding antennas, transmission angles and positions of GPS radio sources relative to the missiles position, angle, direction, pitch roll, etc. and dynamically form a spatially sharp dynamic filter that is dependent on a specific time, day, flight plan, speed, and direction of a missile flight allowing the missile to be programmed with a dynamically sharp filter for a future missile flight. This would allow the missile to reject spoofing signals that do not conform to specific sharp filter requirement preprogrammed into a filter within the missile. GPS radios may also represent fixed or moving radiation sources such as moving vehicle radio systems, ground antenna systems, and orbiting radio systems.

The systems and methods disclosed herein may be embodied in other specific Ruins without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of creating a dynamically sharp location based filter for a flying object comprising:
   placing a recording object containing two or more antennas used for direction finding of one or more moving radio transmitters transmitting one or more radio signals within a testing chamber;
   moving the one or more moving radio transmitters within the testing chamber relative to a future spatial location, angle, and/or position of the flying object over a defined time based on a flight plan of the flying object;
   transmitting the one or more radio signals from the one or more radio transmitters to the recording object within the testing chamber;
   recording an expected angle of arrival of the one or more radio signals of the one or more moving radio transmitters with respect to the future spatial location, angle, and/or position of the flying object over the defined time based on the flight plan of the flying object; and
   programming a filter within the flying object based on the recorded expected angle of arrival of the one or more transmitted radio signals.

2. The method of claim 1, wherein the flying object is a vehicle, a flying device, an electronic device, a satellite, an autonomous vehicle, a projectile, a missile, or an autonomous robot.

* * * * *